(12) United States Patent
Liu et al.

(10) Patent No.: US 9,800,078 B2
(45) Date of Patent: Oct. 24, 2017

(54) HIGH EFFICIENCY CHARGING SYSTEM AND CHARGING CIRCUIT THEREIN

(71) Applicant: RICHTEK TECHNOLOGY CORPORATION, Chupei, HsinChu (TW)

(72) Inventors: Jing-Meng Liu, Zhubei (TW); Li-Wei Lee, Zhubei (TW); Ta-Yung Yang, Zhubei (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 114 days.

(21) Appl. No.: 14/933,266

(22) Filed: Nov. 5, 2015

(65) Prior Publication Data

US 2016/0134135 A1 May 12, 2016

Related U.S. Application Data

(60) Provisional application No. 62/077,198, filed on Nov. 8, 2014.

(51) Int. Cl.
*H02J 7/00* (2006.01)

(52) U.S. Cl.
CPC ............... *H02J 7/008* (2013.01); *Y02B 40/90* (2013.01); *Y02E 70/40* (2013.01)

(58) Field of Classification Search
USPC ......... 320/114, 162, 101, 137, 107, 116, 119
See application file for complete search history.

(56) References Cited

U.S. PATENT DOCUMENTS

| | | | | |
|---|---|---|---|---|
| 5,712,771 A | * | 1/1998 | Fitter | B23K 9/1056 315/307 |
| 7,786,716 B2 | * | 8/2010 | Simburger | B64G 1/428 320/101 |
| 8,102,149 B2 | * | 1/2012 | Hwang | H02J 7/0073 307/66 |
| 9,225,202 B1 | * | 12/2015 | Kim | H02J 9/061 |
| 2007/0290655 A1 | * | 12/2007 | Nate | H02J 7/0052 320/163 |
| 2011/0006748 A1 | * | 1/2011 | Jang | H02M 1/36 323/299 |
| 2011/0031925 A1 | * | 2/2011 | Simburger | B64G 1/428 320/101 |

(Continued)

*Primary Examiner* — Brian Ngo
(74) *Attorney, Agent, or Firm* — Tung & Associates

(57) ABSTRACT

The present invention discloses a high efficiency charging system and a charging circuit therein. The high efficiency charging system includes a power supplier and a power receiver, which are connected via a transmission wire so that power is transmitted from the power supplier to the power receiver. The power receiver includes a voltage conversion circuit and a control circuit. The voltage conversion circuit converts an adjustable input voltage provided by the power supplier to an output voltage and generates an output current for charging a battery. The voltage conversion circuit adaptively adjusts the output current according to a voltage drop between the adjustable input voltage and the output voltage. The control circuit senses the adjustable input voltage and the output voltage and instructs the power supplier to adjust the output voltage according to the voltage drop between the adjustable input voltage and output voltage.

16 Claims, 7 Drawing Sheets

(56) References Cited

U.S. PATENT DOCUMENTS

| | | | | |
|---|---|---|---|---|
| 2014/0253014 A1* | 9/2014 | Nishikawa | ............... | H02J 7/35 320/101 |
| 2014/0354231 A1* | 12/2014 | Xiang | .................. | H02J 7/0042 320/114 |
| 2016/0149417 A1* | 5/2016 | Davis | ................... | H02J 7/0021 320/162 |
| 2016/0164322 A1* | 6/2016 | Li | ............................ | H02J 7/00 320/137 |

* cited by examiner

HIGH EFFICIENCY CHARGING SYSTEM AND CHARGING CIRCUIT THEREIN

CROSS REFERENCE

The present invention claims priority to U.S. 62/077,198, filed on Nov. 8, 2014.

BACKGROUND OF THE INVENTION

Field of Invention

The present invention relates to a charging system and a charging circuit therein; particularly, it relates to a high efficiency charging system which controls a power loss according to a voltage drop between an input voltage and an output voltage, and a charging circuit for use in the charging system.

Description of Related Art

Please refer to FIG. 1, which shows a block diagram of a conventional charging system. The conventional charging system 100 comprises a power supplier 10 and a power receiver 20, which are connected through a transmission wire 70. The power receiver 20 for example can be a portable electronic device such as a mobile phone, a tablet computer, or a notebook, etc. The power supplier 10 for example can be an adaptor.

In such configuration, it is crucial for the charging system to fulfill optimum power utilization efficiency and save hardware costs. And, while optimizing the power utilization efficiency, it is also crucial to provide appropriate protection to the circuits to guard against undesired abnormal events.

In view of the above, the present invention proposes a high efficiency charging system and a charging circuit therein.

SUMMARY OF THE INVENTION

From one perspective, the present invention provides a high efficiency charging system comprising a power supplier and a power receiver, wherein the power supplier and the power receiver are connected through a transmission wire, so that power is transmitted from the power supplier to the power receiver, the transmission wire including positive and negative power transmission lines and a signal transmission line, the power receiver comprising: a voltage conversion circuit for converting an adjustable input voltage provided from the power supplier to an output voltage and generating an output current for charging a battery, wherein the voltage conversion circuit adaptively adjusts the output current according to a voltage drop between the adjustable input voltage and the output voltage; and a first control circuit coupled to the voltage conversion circuit, wherein the first control circuit senses the adjustable input voltage and the output voltage and transmits a transmission signal to the power supplier according to the voltage drop between the adjustable input voltage and the output voltage, so as to instruct the power supplier to control the adjustable input voltage, thereby keeping the voltage drop within a predetermined range.

In one embodiment, when the voltage drop between the adjustable input voltage and the output voltage is higher than a voltage drop threshold, the voltage conversion circuit lowers the output current.

In one embodiment, the power supplier includes: a power regulator for providing the adjustable input voltage; and a second control circuit coupled to the power regulator, wherein the second control circuit generates a control signal according to the transmission signal generated by the first control circuit, to control the power regulator to adjust the adjustable input voltage.

In one embodiment, the voltage conversion circuit includes a Low Drop Out (LDO) regulator.

In one embodiment, the voltage conversion circuit includes: a power switch having a control end, a current inflow end and a current outflow end, wherein the current inflow end is coupled to the adjustable input voltage and the current outflow end is coupled to the output voltage; an error amplifier for generating an error amplification signal according to the output voltage and a voltage reference value, to control the control end of the power switch; a current comparison circuit for generating a control signal according to the output current and a current reference value; and an auxiliary control circuit for controlling the control end of the power switch according to the control signal generated by the current comparison circuit, to adjust the output current.

In one embodiment, the high efficiency charging system further comprises: a current reference value generation circuit for generating the current reference value according to the adjustable input voltage and the output voltage.

In one embodiment, the current reference value generation circuit generates the current reference value further according to a voltage drop threshold and a current upper limit, so that: when the voltage drop is higher than the voltage drop threshold, the voltage conversion circuit lowers the output current; and when the voltage drop is lower than the voltage drop threshold, the output current is maintained at the current upper limit.

In one embodiment, the current reference value generation circuit includes: a summation circuit for generating a signal related to the voltage drop between the adjustable input voltage and the output voltage; and an inverse-response circuit coupled to the summation circuit, for generating the current reference value according to the related signal of the voltage drop, wherein: when the voltage drop is relatively higher, the current reference value is relatively lower; and when the voltage drop is relatively lower, the current reference value is relatively higher.

In one embodiment, the first control circuit includes: a multiplexer for receiving a sensed value of the adjustable input voltage and a sensed value of the output voltage; an analog-to-digital converter coupled to the multiplexer, for converting an output of the multiplexer which is related to the adjustable input voltage or the output voltage to a digital signal; and a microcontroller coupled to the multiplexer and the analog-to-digital converter, wherein the microcontroller instructs the multiplexer to output information related to the adjustable input voltage or the output voltage, the microcontroller providing a transmission signal to the power supplier according to the digital signal, so as to instruct the power supplier to control the adjustable input voltage, thereby keeping the voltage drop within a predetermined range, and the microcontroller generating a control signal according to the digital signal, so as to control the voltage conversion circuit to adjust the output current and/or the output voltage.

From another perspective, the present invention provides a charging circuit adapted to be used in a charging system, wherein the charging system provides an input voltage from a power supplier to a power receiver through a transmission wire, and wherein the charging circuit is in the power receiver, for receiving the input voltage to charge a battery, the charging circuit comprising: a voltage conversion circuit for converting the input voltage to an output voltage and generating an output current for charging the battery; and a control circuit coupled to the voltage conversion circuit, wherein the control circuit generates a control signal according to the voltage drop between the input voltage and the output voltage, so as to control the voltage conversion circuit to adjust the output current, so that when the voltage drop between the input voltage and the output voltage is higher than a voltage drop threshold, the voltage conversion circuit lowers the output current.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the circuits and devices, but not drawn according to actual scale.

Figure 1:
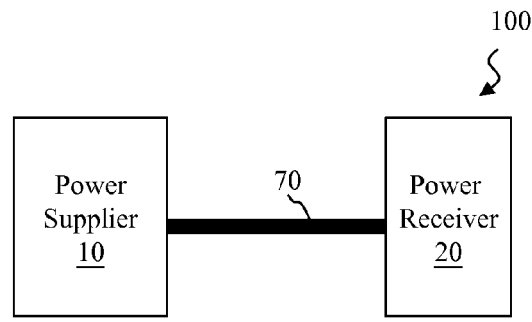
FIG. 1 shows a block diagram of a conventional charging system.
Figure 2:
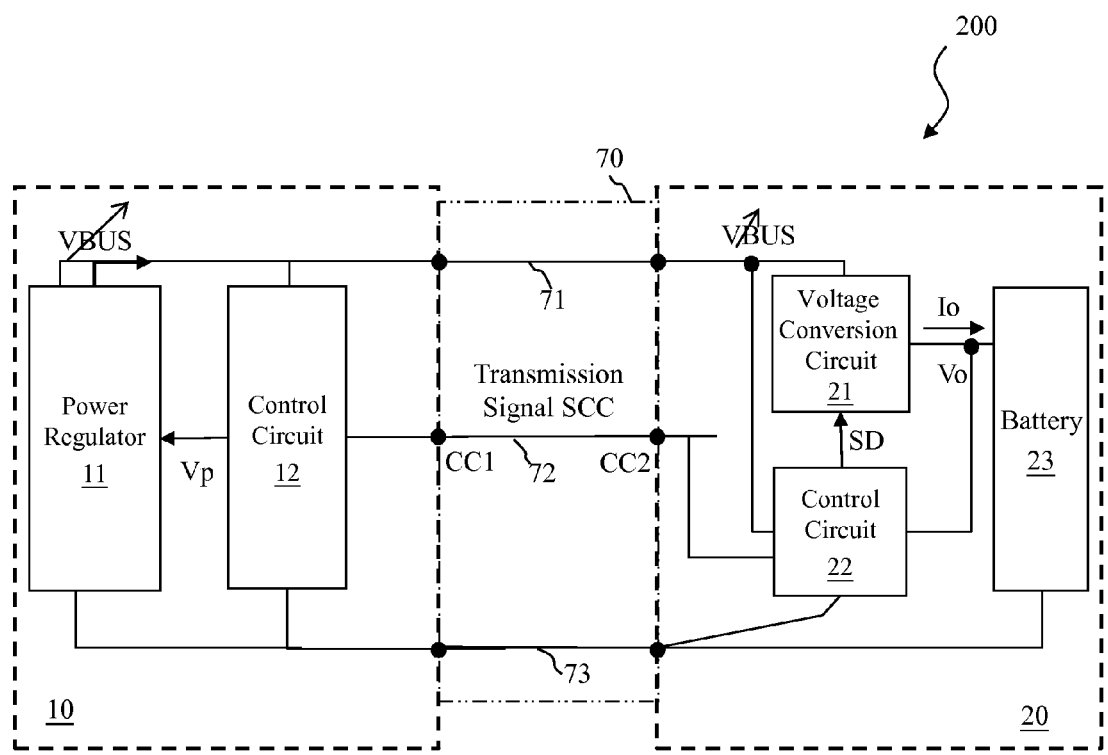
FIG. 2 shows a block diagram of a high efficiency charging system according to an embodiment of the present invention.

Please refer to FIG. 2, which shows a block diagram of a high efficiency charging system according to an embodiment of the present invention. As shown in FIG. 2, the high efficiency charging system 200 of this embodiment comprises a power supplier 10, a transmission wire 70 and a power receiver 20. In one embodiment, the power supplier 10 for example can be an adapter. In one embodiment, the power receiver 20 for example can be a portable electronic device such as a mobile phone, a tablet computer, or a notebook, etc. The power supplier 10 and the power receiver 20 are coupled to each other through the transmission wire 70, so that power is transmitted from the power supplier 10 to the power receiver 20. In this embodiment, the transmission wire 70 includes a positive power transmission line 71, a negative power transmission line 73 and a signal transmission line 72. When the power supplier 10 and the power receiver 20 are coupled to each other through the transmission wire 70, the positive power transmission line 71 and the negative power transmission line 73 form a loop to transmit power. The signal transmission line 72 can be used to transmit a transmission signal SCC between a node CC1 of the power supplier 10 and a node CC2 of the power receiver 20, for bi-directional communication between the power supplier 10 and the power receiver 20.

As shown in FIG. 2, in one embodiment, the power supplier 10 includes a power regulator 11 and a control circuit 12. The power receiver 20 includes a voltage conversion circuit 21, a control circuit 22 and a battery 23. The voltage conversion circuit 21 converts an input voltage VBUS to an output voltage Vo and generates an output current Io for charging the battery 23. The power regulator 11 of the power supplier 10 is controlled by a control signal Vp generated by the control circuit 12, to provide the input voltage VBUS. In the present invention, the input voltage VBUS is an adjustable voltage. The control circuit 12 generates the control signal Vp according to the transmission signal SCC generated by the control circuit 22, to control the power regulator 11 to adjust the input voltage VBUS. The power regulator 11 can be any type of power regulator, such as a switching regulator or any other type of voltage conversion circuit.

In one embodiment, the voltage conversion circuit 21 can be, for example but not necessarily, a Low Drop Out (LDO) regulator (the details of the circuit will be described later). In other embodiments, the voltage conversion circuit 21 can be a switching regulator or any other type of voltage conversion circuit. LDO regulators and switching regulators are both commonly used voltage conversion circuits. As compared to a switching regulator, a LDO regulator is advantageous in that it requires less components; for example, a LDO regulator does not need an inductor (which is costly) as a switching regulator does. On the other hand, however, a power switch of a switching regulator switches between ON and OFF, whereas a power switch of a LDO regulator is kept conductive. Therefore, while performing a voltage conversion operation, a LDO regulator would undesirably consume power, and such a power loss can be represented as:

$$P=I*V$$

wherein P is the power loss; I is a current flowing through the power switch (the output current Io in FIG. 2); and V is a voltage across the power switch ("the input voltage VBUS minus the output voltage Vo" in FIG. 2). To optimize the charging efficiency, the present invention proposes: first, controlling the voltage across the power switch at a low level; second, when the voltage across the power switch is too high (temporarily not under control or due to an abnormal event), lowering down the current flowing through the power switch. When the voltage conversion circuit 21 is a LDO regulator, the present invention can effectively reduce the power loss. When the voltage conversion circuit 21 is a switching regulator, the present invention is still beneficial in reducing power loss.

More specifically, please refer to FIG. 2. The control circuit 22 is coupled to the voltage conversion circuit 21. The control circuit 22 senses the input voltage VBUS and the output voltage Vo. In one embodiment, the output voltage Vo is related to a voltage of the battery 23 and the battery 23 for example can be a rechargeable battery. Accordingly, the output voltage Vo is not a constant when the battery 23 has not yet been fully charged. According to the present invention, the control circuit 22 can determine a desired target level of the input voltage VBUS according to the output voltage Vo, so that the voltage across the power switch is equal to or lower than a predetermined value. The control circuit 22 can transmit a transmission signal SCC indicating corresponding information (the desired target level of the output voltage Vo or its corresponding code) via the signal transmission line 72 to the control circuit 12 of the power supplier 10, so as to request the power supplier 10 to adjust the input voltage VBUS. The power supplier 10 adjusts the input voltage VBUS to the desired target level according to this information, which is to control the voltage across the power switch (which is equal to VBUS−Vo), so that the power loss is optimized. On the other hand, when the voltage across the power switch is too high, the control circuit 22 can issue a control signal SD, to lower down the output current Io flowing through the power switch. Besides, the control signal SD can, preferably but not necessarily, include information for setting the desired level of the output voltage Vo. The transmission signal SCC and the control signal SD can each be a digital signal or an analog signal.

Figure 3:
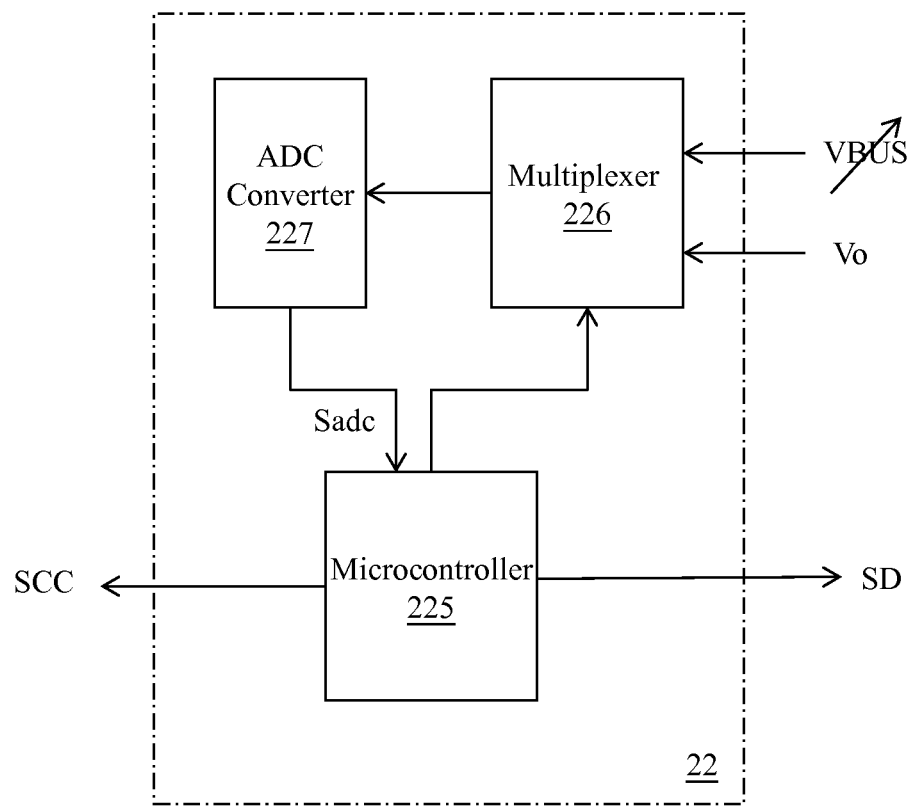
FIG. 3 shows a block diagram of a control circuit 22 according to an embodiment of the present invention.

FIG. 3 shows a block diagram of a control circuit 22 according to an embodiment of the present invention. As shown in FIG. 3, in one embodiment, the control circuit 22 includes a multiplexer 226, an analog-to-digital (ADC) converter 227 and a microcontroller 225. The multiplexer 226 receives a sensed value of the input voltage VBUS and a sensed value of the output voltage Vo. The ADC converter 227 is coupled to the multiplexer 226, and the ADC converter 227 converts an output of the multiplexer 226, which is related to the input voltage VBUS or the output voltage Vo, to a digital signal Sadc. The microcontroller 225 is coupled to the multiplexer 226 and the ADC converter 227. The microcontroller 225 issues a signal to instruct the multiplexer 226 to output information related to either the input voltage VBUS or the output voltage Vo. The microcontroller 225 receives information related to the input voltage VBUS and the output voltage Vo according to the digital signal Sadc, and the microcontroller 225 sends the transmission signal SCC to the control circuit 12 of the power supplier 10 according to such information, to instruct the power supplier 10 to control the input voltage VBUS, so as to keep the voltage drop (i.e., VBUS−Vo) within a predetermined range. Moreover, whenever it is necessary, the microcontroller 225 can generate a control signal SD to control the voltage conversion circuit 21, so as to adjust the output current Io and/or adjusting the output voltage Vo.

The control circuit 22 shown in FIG. 3 is only one illustrative embodiment. It is not necessary for the control circuit 22 to process the signals in a digital form. An embodiment as to how the control circuit 22 processes the signals in an analog form will be described later.

Figure 4:
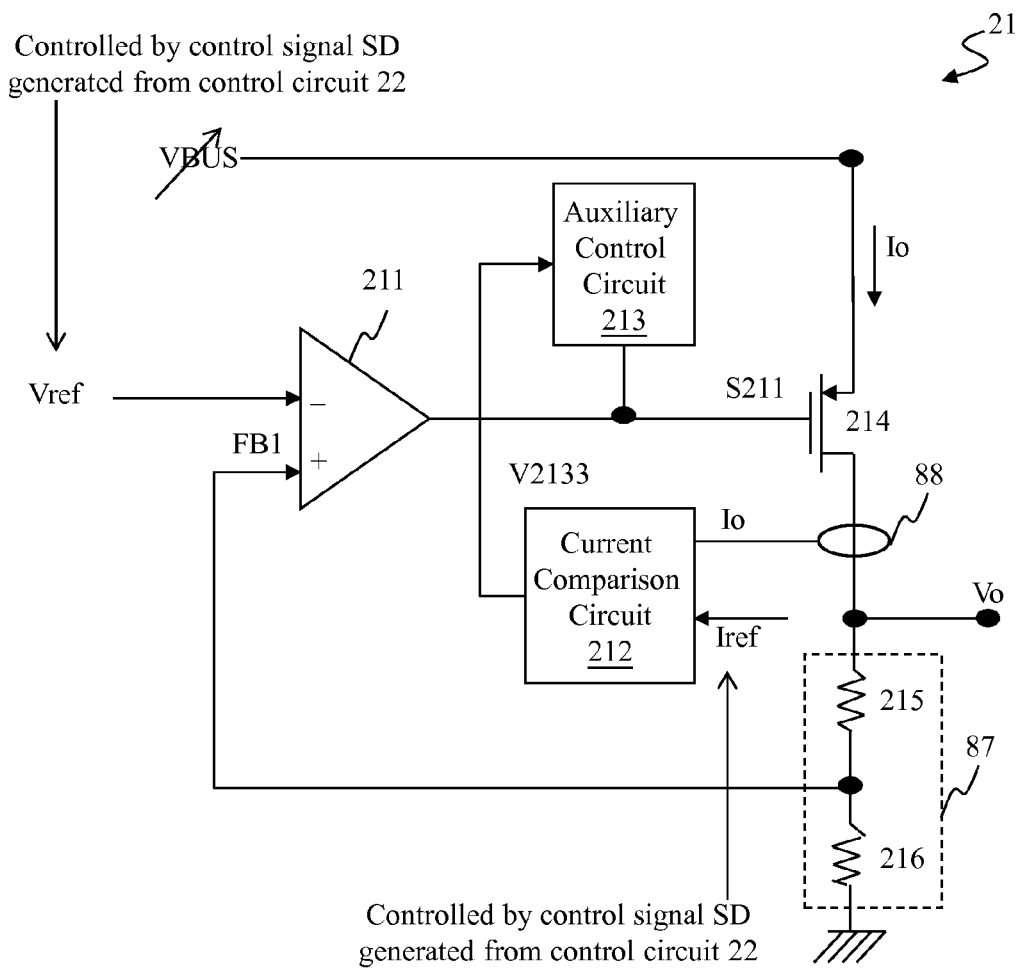
FIG. 4 shows a block diagram of a voltage conversion circuit according to an embodiment of the present invention.
Figure 5:
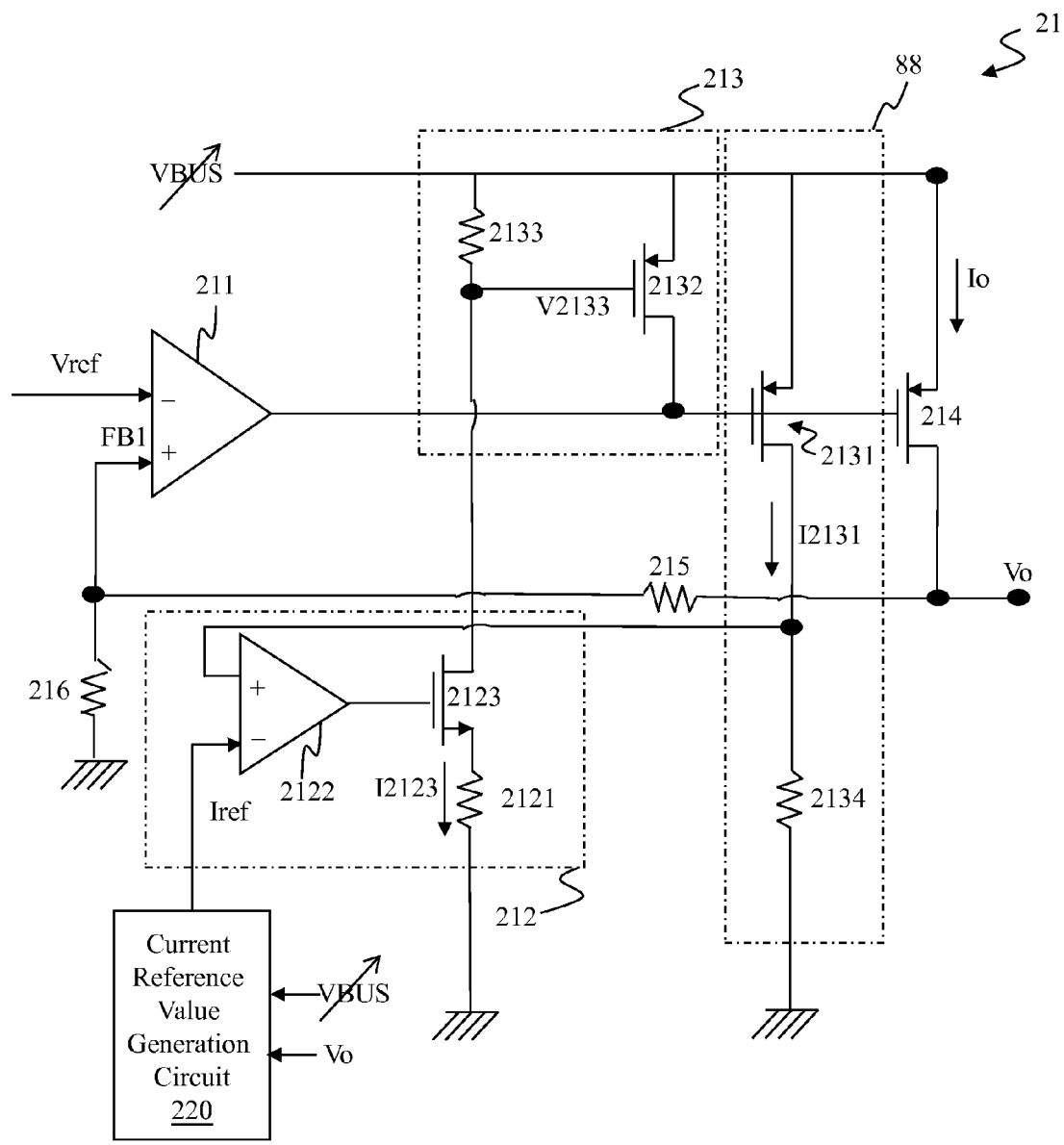
FIG. 5 shows a preferred embodiment of the voltage conversion circuit of FIG. 4.

Please refer to FIG. 4 and FIG. 5. FIG. 4 shows a block diagram of a voltage conversion circuit (in this embodiment, it is a LDO regulator) according to an embodiment of the present invention. FIG. 5 shows one preferred embodiment of FIG. 4. The voltage conversion circuit 21 includes a power switch 214, an error amplifier 211, a current comparison circuit 212 and an auxiliary control circuit 213. In one embodiment, the power switch 214 can be, for example but not limited to, a PMOS power switch. As shown in FIG. 4, the power switch 214 has a control end, a current inflow end and a current outflow end. The current inflow end is coupled to the input voltage VBUS. The current outflow end is coupled to the output voltage Vo. The output voltage Vo can be sensed and feedback controlled by comparing the output voltage Vo or its related signal (e.g., a divided voltage of the output voltage Vo) with a voltage reference value Vref, which is performed by the error amplifier 211, to generate an error amplification signal S211 controlling the control end of the power switch 214. The charging current (i.e., the output current Io) of the battery 23 can be sensed and feedback controlled by comparing the output current Io or its related signal with a current reference value Iref, which is performed by the current comparison circuit 212, to generate a control signal V2133 controlling the control end of the power switch 214, so that the output current Io is adjustable. The current reference value Iref can be controlled by the control signal SD outputted from the microcontroller 225. Moreover, whenever it is necessary, the voltage reference value Vref can also be controlled by the control signal SD outputted from the microcontroller 225.

In one embodiment, the output voltage Vo can be sensed through, for example but not limited to, a voltage sensing device 87. The voltage sensing device 87 can be, for example but not limited to, a voltage divider circuit formed by a resistor 215 and a resistor 216 connected in series. The voltage sensing device 87 transmits the sensed voltage to the error amplifier 211. The error amplifier 211 generates the error amplification signal S211 according to the sensed voltage of the output voltage Vo and the voltage reference value Vref, to control the operation of the power switch 214. In this embodiment, the voltage reference value Vref corresponds to a safe maximum voltage of the battery 23, and the voltage conversion circuit 21 charges the battery 23 according to this target. In another embodiment, the voltage reference value Vref can be set for another purpose.

In one embodiment, the output current Io flowing through the power switch 214 can be sensed through, for example but not limited to, a current sensing device 88. The current sensing device 88 can be, for example but not limited to, a sensing transistor connected to the power switch 214 in parallel or a sensing resistor connected in series in the path of the output current Io. Current sense can be achieved by many approaches, and the scope of the present invention is not limited to any one of them. The current sensing device transmits the current sensing result to the current comparison circuit 212. The current comparison circuit 212 generates the control signal V2133 according to the current sensing result and the current reference value Iref, and the control signal V2133 is inputted into the auxiliary control circuit 213. The current reference value Iref corresponds to a desired level of the charging current (i.e., the output current Io) that is provided from the voltage conversion circuit 21 to the battery 23 during a charging operation. The charging current (i.e., the output current Io) during the charging operation can be regulated at the above-mentioned desired level according to this current reference value Iref. In this embodiment, when the voltage drop (which is equal to VBUS−Vo) between the input voltage VBUS and the output voltage Vo is too high (e.g., higher than a predetermined value, referred to hereinafter as "voltage drop threshold"), the voltage conversion circuit lowers down the output current Io.

As shown in FIG. 5, in one embodiment, the current comparison circuit 212 for example includes an error amplifier 2122, a transistor 2123 and a resistor 2121. The transistor 2123 has a control end, a current inflow end and a current outflow end. The current inflow end is coupled to the auxiliary control circuit 213. The current outflow end is coupled to the resistor 2121. The resistor 2121 is coupled between the current outflow end of the transistor 2123 and ground. In one embodiment, the power switch 2123 can be, for example but not limited to, an NMOS power switch.

In one embodiment, the current sensing device 88 for example includes a transistor 2131 and a resistor 2134. In one embodiment, the transistor 2131 and the power switch 214 can be, for example but not limited to, PMOS transistors. More specifically, the transistor 2131 and the power switch 214 form a current mirror, which duplicates the output current Io to generate a current I2131. The current I2131 and the resistor 2134 converts a sensed value of the output current Io to a voltage signal, which is inputted to the error amplifier 2122. The error amplifier 2122 compares the current sensing result of the output current Io with the current reference value Iref to generate a comparison result, by which the error amplifier 2122 controls the transistor 2123 to thereby control the current I2123.

The auxiliary control circuit 213 for example includes a transistor 2132 and a resistor 2133. The current inflow end of the transistor 2132 is coupled to the input voltage VBUS. An end of the resistor 2133 is also coupled to the input voltage VBUS. The other end of the resistor 2133 controls a control end of the transistor 2132. The current outflow end of the transistor 2132 is coupled to the control end of the power switch 214. Besides, a node where the control end of the transistor 2132 is coupled to the resistor 2133 is coupled to and controlled by the current comparison circuit 212. In one embodiment, the transistor 2132 can be, for example but not limited to, a PMOS transistor.

Still referring to FIG. 5, the current I2131 increases as the output current Io increases, so a product of the current I2131 multiplied by the resistance of the resistor 2134 (i.e., the voltage at the upper end of the resistor 2134) increases. Accordingly, a difference between the voltage at the upper end of the resistor 2134 and the current reference value Iref increases (in this embodiment, the current reference value Iref is in a voltage signal), so the current I2123 increases. Thus, a product of the current I2123 multiplied by the resistance of the resistor 2133 increases, causing a voltage difference (Vgs) between the gate and the source of the transistor 2132 to be greater, and the transistor 2132 becomes more conductive. Therefore, a voltage at the control end of the power switch 214 (i.e., the voltage at the lower end of the resistor 2132) will be closer to the input voltage VBUS, causing a voltage difference (Vgs) between the gate and the source of the power switch 214 to be smaller, whereby the power switch 214 becomes less conductive. As a result, the output current Io will be lowered down. The above-mentioned mechanism indicates that the output current Io will eventually reach to a stable status and is regulated at a desired level. Such desired level corresponds to the current reference value Iref. Therefore, when the voltage drop (which is equal to VBUS−Vo) between the input voltage VBUS and the output voltage Vo is too high, by lowering the current reference value Iref, the voltage conversion circuit can lower down the output current Io. Consequently, the product of Io multiplied by (VBUS−Vo) (i.e., Io*(VBUS−Vo)) will be reduced, thus lowering down the power loss.

According to the present invention, the current reference value generation circuit 220 determines the current reference value Iref according to the input voltage VBUS and the output voltage Vo, to achieve the above-mentioned objective of "lowering the current reference value Iref when (VBUS−Vo) is too high". If the control signal SD outputted from the control circuit 22 is a digital signal, the current reference value generation circuit 220 can be a digital-to-analog converter or a lookup table circuit, which determines the current reference value Iref according to the control signal SD in a digital form. Under such circumstance, the current reference value generation circuit 220 can be, for example but not limited to, a part of the voltage conversion circuit 21. On the other hand, as mentioned above, the control circuit 22 is not limited to the embodiment shown in FIG. 3. It is not necessary for the control circuit 22 to process the signal in a digital way. The current reference value generation circuit 220 can also be, for example but not limited to, a part of the control circuit 22, which generates the current reference value Iref in an analog way. Under such circumstance, the current reference value Iref can be regarded as the control signal SD outputted from the control circuit 22. For the details of the latter embodiment, please refer to FIG. 6A and FIG. 6B.

Figure 6A:
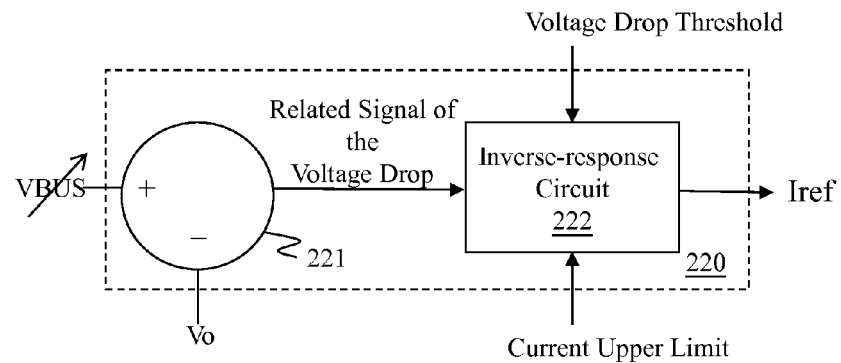
FIG. 6A shows a block diagram of a current reference value generation circuit according to an embodiment of the present invention.
Figure 6B:
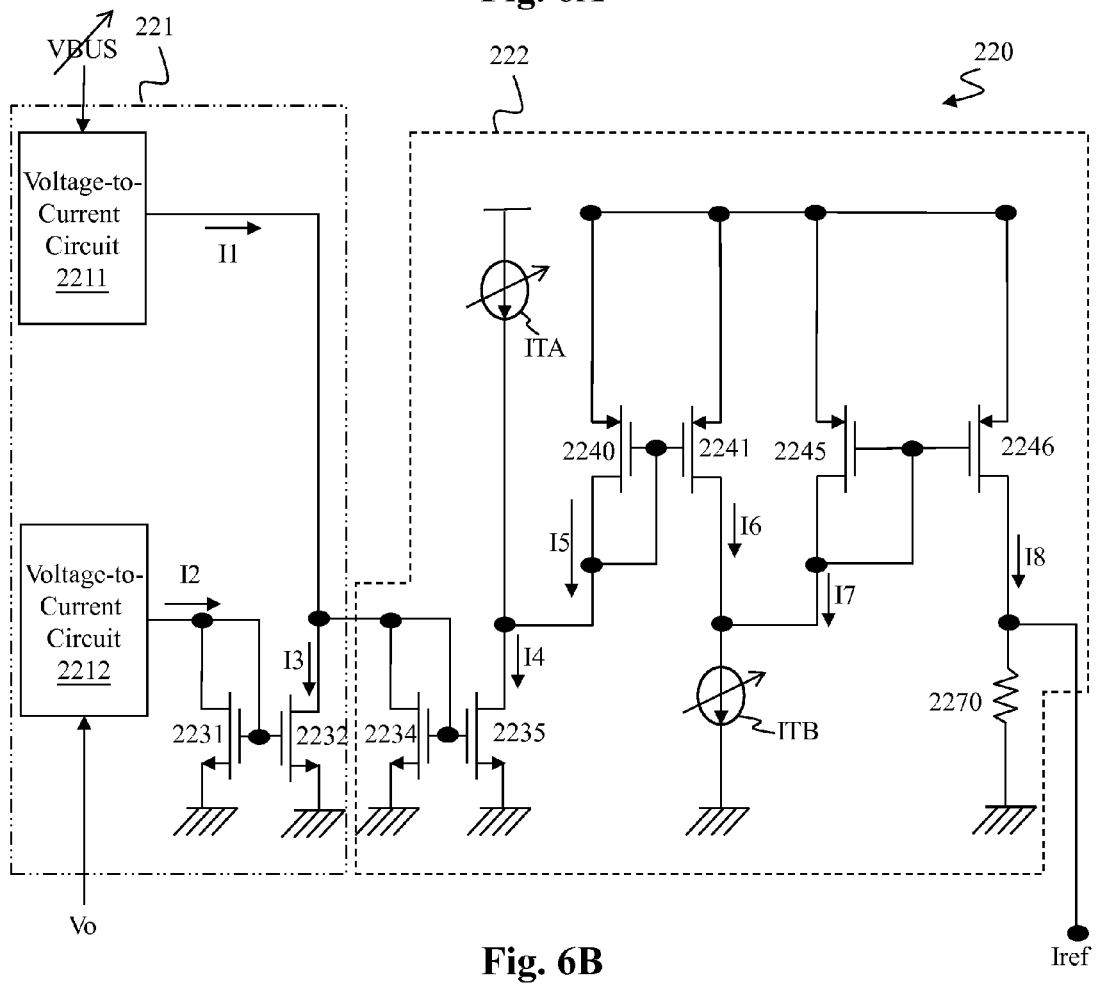
FIG. 6B shows a preferred embodiment of the current reference value generation circuit.

Please refer to FIG. 6A and FIG. 6B. FIG. 6A shows a block diagram of a current reference value generation circuit according to an embodiment of the present invention. FIG. 6B shows a specific example, which is a preferred embodiment of a current reference value generation circuit. As shown in FIG. 6A, in one embodiment, the current reference value generation circuit 220 includes a summation circuit 221 and an inverse-response circuit 222. The summation circuit 221 generates a signal related to the voltage drop (i.e., VBUS−Vo) according to the input voltage VBUS and the output voltage Vo. The inverse-response circuit 222 is coupled to the summation circuit 221. The inverse-response circuit 222 generates the current reference value Iref according to the signal related to the voltage drop (i.e., VBUS−Vo), such that: when the voltage drop (i.e., VBUS−Vo) is relatively higher, the current reference value Iref is relatively lower; when the voltage drop (i.e., VBUS−Vo) is relatively lower, the current reference value Iref is relatively higher.

In another embodiment, a voltage drop threshold and a current upper limit can be set into the current reference value generation circuit 222, so that the current reference value generation circuit 222 generates the current reference value Iref not only according to the voltage drop (i.e., VBUS−Vo) but further according to the voltage drop threshold and the current upper limit. When the voltage drop (i.e., VBUS−Vo) is lower than the voltage drop threshold, the current reference value Iref is maintained at the current upper limit; when the voltage drop (i.e., VBUS−Vo) is higher than the voltage drop threshold, the current reference value Iref becomes lower as the voltage drop (i.e., VBUS−Vo) becomes higher, to an extent that the current reference value Iref becomes zero. For the details of this embodiment, please refer to FIG. 6B.

As shown in FIG. 6B, the summation circuit 221 for example includes a voltage-to-current circuit 2211, a voltage-to-current circuit 2212, a transistor 2231 and a transistor 2232. The voltage-to-current circuit 2211 converts the input voltage VBUS to a current I1. The voltage-to-current circuit 2212 converts the output voltage Vo to a current I2. The transistor 2231 and the transistor 2232 form a current mirror circuit. As shown in FIG. 6B, the transistor 2231 has a control end, a current inflow end and a current outflow end. The transistor 2232 has a control end, a current inflow end and a current outflow end. The current inflow end of the transistor 2232 is coupled to the voltage-to-current circuit 2211, and the current outflow end of the transistor 2232 is coupled to ground. The current inflow end of the transistor 2231 is coupled to the voltage-to-current circuit 2212, and the current outflow end of the transistor 2231 is coupled to ground. The control end of the transistor 2231 and the control end of the transistor 2232 are coupled to each other.

By means of this summation circuit 221, the voltage drop (i.e., VBUS−Vo) between the input voltage VBUS and the output voltage Vo can be represented by a current I3, in which the current I3 (a current signal corresponding to the voltage drop) is equal to the current I1 minus the current I2.

As shown in FIG. 6B, in one embodiment, the inverse-response circuit 222 for example includes a resistor 2270, transistors 2234 and 2235 (which form a current mirror circuit), transistors 2240 and 2240 (which form another current mirror circuit) transistors 2245 and 2246 (which form yet another current mirror circuit), a current source ITA (for providing a current ITA) and a current source ITB (for providing a current ITB). The current source ITA defines the voltage drop threshold and the current source ITB defines the current upper limit. In one embodiment, the voltage drop threshold and the current upper limit are adjustable.

More specifically, the current mirror circuit formed by transistors 2234 and 2235 duplicates the current I3 to generate a current I4. The current I4 corresponds to "current I1 minus current I2"; that is, the current I4 corresponds to the voltage drop. A current I5 is equal to the current I4 minus ITA. The current mirror circuit formed by the transistors 2240 and 2241 duplicates the current I5 to generate a current I6. Thus, the current I6 corresponds to "current I4 minus ITA". A current I7 is equal to ITB minus the current I6. The current mirror circuit formed by the transistors 2245 and 2246 duplicates the current I7 to generate a current I8. Thus, the current I8 corresponds to "ITB minus the current I6". The current I8 flows through the resistor 2270 to generate the current reference value Iref, so the current reference value Iref is a voltage signal, which is equal to a product of the current I8 multiplied by a resistance of the resistor 2270.

It is not necessary for each current mirror circuit to have a duplication ratio of 1. Assuming that the current mirror circuit formed by transistors 2234 and 2235 has a duplication ratio of KA, the current mirror circuit formed by transistors 2240 and 2241 has a duplication ratio of KB, and the current mirror circuit formed by transistors 2245 and 2246 has a duplication ratio of K1, the current reference value Iref can be represented by the following equation:

$$Iref = K1 \times (ITB - I6) \times R2270,$$

wherein R2270 is the resistance of the resistor 2270.

And, the current I6 can be represented by the following equation:

$$I6 = \{[KA \times (VBUS - Vo)] - ITA\} \times KB$$

When [KA×(VBUS−Vo)] is smaller than ITA, the current I6 is equal to zero. And, the current reference value Iref=K1×ITB×R2270, which is the current upper limit of the current reference value Iref. When [KA×(VBUS−Vo)] is greater than ITA, the current reference value Iref begins to decrease. Therefore, the current source ITA defines the voltage drop threshold, whereas the current source ITB defines the current upper limit. When the current I6 is greater than ITB, the current reference value Iref is equal to zero. That is, when [KA×(VBUS−Vo)]>(ITB/KB)+ITA, the charging operation to the battery 23 is stopped.

ITA, ITB, K1, KA and KB can be set according to the above-mentioned equations, depending upon the practical needs.

Figure 7A:
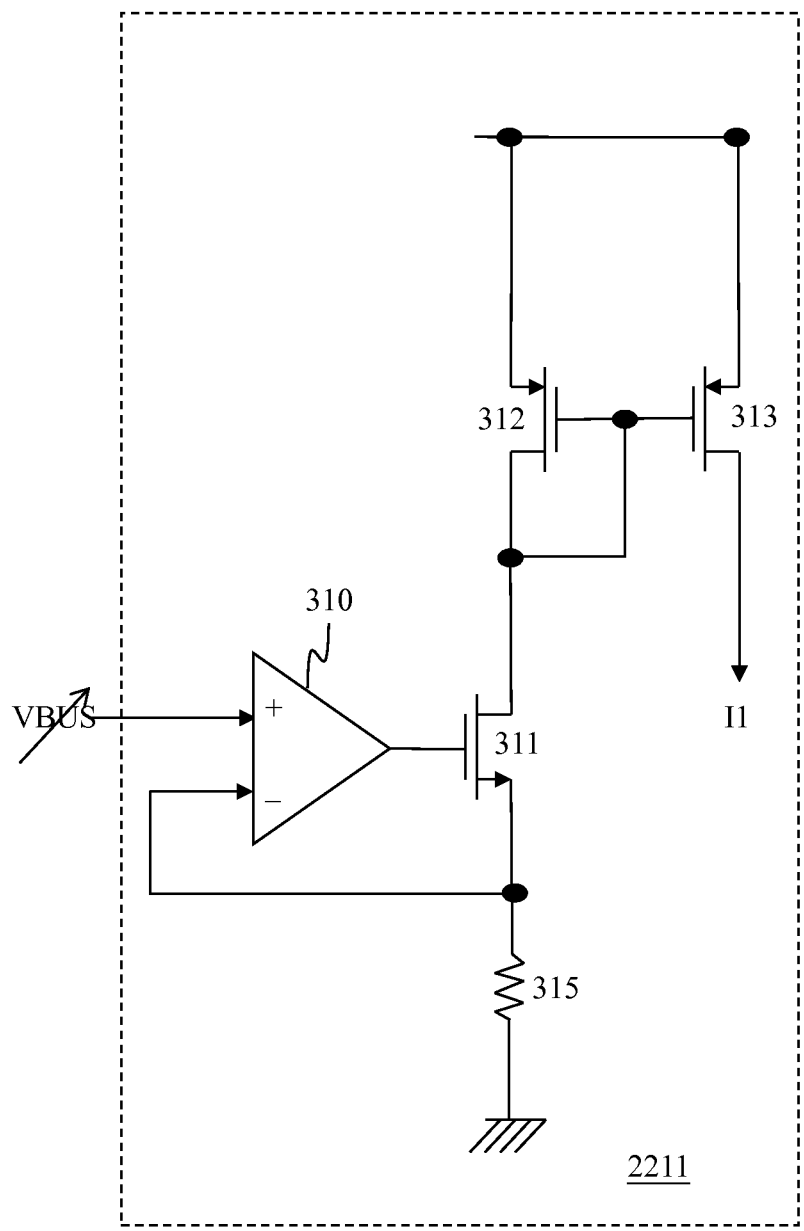
FIG. 7A shows an embodiment of a voltage-to-current circuit 2211.
Figure 7B:
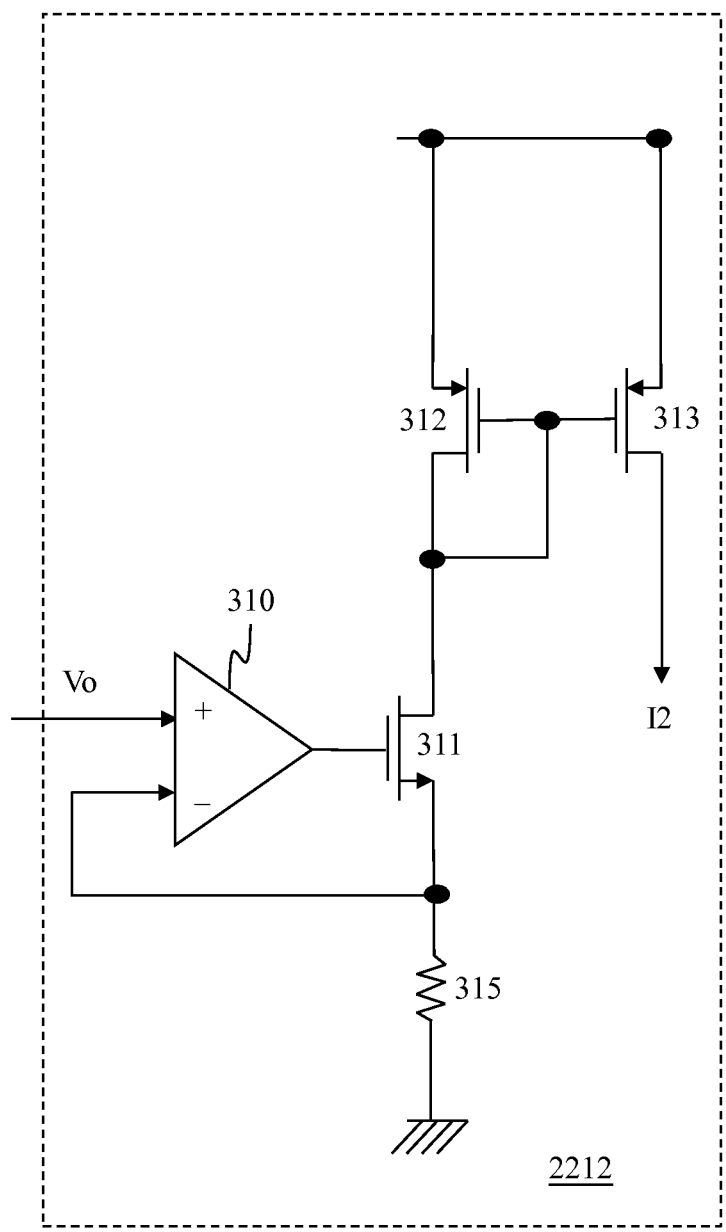
FIG. 7B shows an embodiment of a voltage-to-current circuit 2212.

Please refer to FIG. 7A and FIG. 7B. FIG. 7A shows an embodiment of a voltage-to-current circuit 2211. FIG. 7B shows an embodiment of a voltage-to-current circuit 2212.

As shown in FIG. 7A, in one embodiment, the voltage-to-current circuit 2211 for example includes an error amplifier 310, a resistor 315 and a transistor 311. Optionally, the voltage-to-current circuit 2211 can further include a current mirror circuit formed by transistors 312 and 313. The circuit configuration in FIG. 7B is similar to the circuit configuration in FIG. 7A, but is different in the input. When the feedback loop reaches a stable state, the voltages at two input ends of the error amplifier 310 are equal to each other (assuming that the internal device mismatch is neglectable). Hence, the current I1 is equal to the input voltage VBUS divided by the resistance of the resistor 315, and the current I2 is equal to the output voltage Vo divided by the resistance of the resistor 315 (certainly, it is also practicable and within the scope of the present invention that two circuits employ two resistors having different resistances). Thus, the input voltage VBUS is converted to the current I1 and the output voltage Vo is converted to the current I2.

Note that although in one application, the input voltage VBUS is adjustable and the control circuit 22 can transmit a transmission signal SCC to the control circuit 12 of the power supplier 10, to instruct the power supplier 10 to control the input voltage VBUS, the embodiments shown in FIGS. 4, 5 and 6A-6B are not limited to being applied only to such circumstance. The present invention can also be applied to a circumstance where the input voltage VBUS is not adjustable, and the present invention can be adopted to adjust the current reference value Iref, so as to control the output current Io.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, there can be more or less current mirror circuits in the embodiment of FIG. 6B. For another example, a signal can be level shifted, converted from a current form to a voltage form or converted from a voltage form to a current form, scaled up or down (such as by a current mirror or a voltage divider circuit), etc., so by describing "to perform an operation according to a signal (original signal)", it should mean to include, equivalently, performing an operation according to a signal that relates to and is level-shifted, form converted, or scaled up or down from the original signal; for instance, a comparator comparing a signal X with a signal Y is equivalent to a comparator comparing a divided voltage of the signal X with a divided voltage of the signal Y. In view of the foregoing, the spirit of the present invention should cover all such and other modifications and variations, which should be interpreted to fall within the scope of the following claims and their equivalents.

What is claimed is:

1. A high efficiency charging system comprising a power supplier and a power receiver, wherein the power supplier and the power receiver are connected through a transmission wire, so that power is transmitted from the power supplier to the power receiver, the transmission wire including positive and negative power transmission lines and a signal transmission line, the power receiver comprising:

a voltage conversion circuit for converting an adjustable input voltage provided from the power supplier to an output voltage and generating an output current for charging a battery, wherein the voltage conversion circuit adaptively adjusts the output current according to a voltage drop between the adjustable input voltage and the output voltage; and a first control circuit coupled to the voltage conversion circuit, wherein the first control circuit senses the adjustable input voltage and the output voltage and transmits a transmission signal to the power supplier according to the voltage drop between the adjustable input voltage and the output voltage, so as to instruct the power supplier to control the adjustable input voltage, thereby keeping the voltage drop within a predetermined range.

2. The high efficiency charging system of claim 1, wherein when the voltage drop between the adjustable input voltage and the output voltage is higher than a voltage drop threshold, the voltage conversion circuit lowers the output current.

3. The high efficiency charging system of claim 1, wherein the power supplier includes:
- a power regulator for providing the adjustable input voltage; and
- a second control circuit coupled to the power regulator, wherein the second control circuit generates a control signal according to the transmission signal generated by the first control circuit, to control the power regulator to adjust the adjustable input voltage.

4. The high efficiency charging system of claim 1, wherein the voltage conversion circuit includes a Low Drop Out (LDO) regulator.

5. The high efficiency charging system of claim 1, wherein the voltage conversion circuit includes:
- a power switch having a control end, a current inflow end and a current outflow end, wherein the current inflow end is coupled to the adjustable input voltage and the current outflow end is coupled to the output voltage;
- an error amplifier for generating an error amplification signal according to the output voltage and a voltage reference value, to control the control end of the power switch;
- a current comparison circuit for generating a control signal according to the output current and a current reference value; and
- an auxiliary control circuit for controlling the control end of the power switch according to the control signal generated by the current comparison circuit, to adjust the output current.

6. The high efficiency charging system of claim 5, further comprising:
- a current reference value generation circuit for generating the current reference value according to the adjustable input voltage and the output voltage.

7. The high efficiency charging system of claim 6, wherein the current reference value generation circuit generates the current reference value further according to a voltage drop threshold and a current upper limit, so that:
- when the voltage drop is higher than the voltage drop threshold, the voltage conversion circuit lowers the output current; and
- when the voltage drop is lower than the voltage drop threshold, the output current is maintained at the current upper limit.

8. The high efficiency charging system of claim 6, wherein the current reference value generation circuit includes:
- a summation circuit for generating a signal related to the voltage drop between the adjustable input voltage and the output voltage; and
- an inverse-response circuit coupled to the summation circuit, for generating the current reference value according to the related signal of the voltage drop, wherein:
  - when the voltage drop is relatively higher, the current reference value is relatively lower; and
  - when the voltage drop is relatively lower, the current reference value is relatively higher.

9. The high efficiency charging system of claim 1, wherein the first control circuit includes:

- a multiplexer for receiving a sensed value of the adjustable input voltage and a sensed value of the output voltage;
- an analog-to-digital converter coupled to the multiplexer, for converting an output of the multiplexer which is related to the adjustable input voltage or the output voltage to a digital signal; and
- a microcontroller coupled to the multiplexer and the analog-to-digital converter, wherein the microcontroller instructs the multiplexer to output information related to the adjustable input voltage or the output voltage, the microcontroller providing a transmission signal to the power supplier according to the digital signal, so as to instruct the power supplier to control the adjustable input voltage, thereby keeping the voltage drop within a predetermined range, and the microcontroller generating a control signal according to the digital signal, so as to control the voltage conversion circuit to adjust the output current and/or the output voltage.

10. A charging circuit adapted to be used in a charging system, wherein the charging system provides an input voltage from a power supplier to a power receiver through a transmission wire, and wherein the charging circuit is in the power receiver, for receiving the input voltage to charge a battery, the charging circuit comprising:
- a voltage conversion circuit for converting the input voltage to an output voltage and generating an output current for charging the battery; and
- a control circuit coupled to the voltage conversion circuit, wherein the control circuit generates a first control signal according to the voltage drop between the input voltage and the output voltage, so as to control the voltage conversion circuit to adjust the output current, so that when the voltage drop between the input voltage and the output voltage is higher than a voltage drop threshold, the voltage conversion circuit lowers the output current.

11. The charging circuit of claim 10, wherein the voltage conversion circuit includes a Low Drop Out (LDO) regulator.

12. The charging circuit of claim 10, wherein the voltage conversion circuit includes:
- a power switch having a control end, a current inflow end and a current outflow end, wherein the current inflow end is coupled to the input voltage and the current outflow end is coupled to the output voltage;
- an error amplifier for generating an error amplification signal according to the output voltage and a voltage reference value, to control the control end of the power switch;
- a current comparison circuit for generating a second control signal according to the output current and a current reference value; and
- an auxiliary control circuit for controlling the control end of the power switch according to the second control signal generated by the current comparison circuit, to adjust the output current.

13. The charging circuit of claim 12, wherein the control circuit includes:
- a current reference value generation circuit for generating the current reference value according to the input voltage and the output voltage.

14. The charging circuit of claim 13, wherein the current reference value generates the current reference value further according to a voltage drop threshold and a current upper limit, so that:

when the voltage drop is higher than the voltage drop threshold, the voltage conversion circuit lowers the output current; and when the voltage drop is lower than the voltage drop threshold, the output current is maintained at the current upper limit.

15. The charging circuit of claim 13, wherein the current reference value generation circuit includes:
   a summation circuit for generating a signal related to the voltage drop between the adjustable input voltage and the output voltage; and
   an inverse-response circuit coupled to the summation circuit, for generating the current reference value according to the related signal of the voltage drop, wherein:
   when the voltage drop is relatively higher, the current reference value is relatively lower; and
   when the voltage drop is relatively lower, the current reference value is relatively higher.

16. The charging circuit of claim 13, wherein the input voltage is adjustable, and the control circuit transmits a transmission signal to the power supplier according to the voltage drop between the input voltage and the output voltage through the transmission wire, to request the power supplier to adjust the input voltage.

* * * * *